United States Patent
Hedayat et al.

(10) Patent No.: US 8,908,783 B2
(45) Date of Patent: Dec. 9, 2014

(54) SCHEDULING COLLABORATIVE UPLINK TRANSMISSIONS IN OFDMA SYSTEMS USING MULTIPATH DIRECTION OF ARRIVAL ANALYSIS

(75) Inventors: Ahmadreza Hedayat, Allen, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1135 days.

(21) Appl. No.: 12/582,764

(22) Filed: Oct. 21, 2009

(65) Prior Publication Data

US 2011/0090974 A1    Apr. 21, 2011

(51) Int. Cl.
| H04L 27/28 | (2006.01) |
| H04B 7/08 | (2006.01) |
| H04B 7/04 | (2006.01) |
| H04B 7/06 | (2006.01) |

(52) U.S. Cl.
CPC .............. *H04B 7/0697* (2013.01); *H04B 7/086* (2013.01); *H04B 7/0452* (2013.01)
USPC ........... 375/260; 375/267; 375/295; 375/299; 455/103; 455/500

(58) Field of Classification Search
CPC .... H04B 7/0452; H04B 7/026; H04B 7/0491; H04B 7/0613; H04B 7/0408; H04W 72/1268; H04W 72/121; H04W 72/046
USPC .......... 375/260, 267, 295, 299; 455/500, 103; 370/329, 334
See application file for complete search history.

(56) References Cited

U.S. PATENT DOCUMENTS

| 2002/0136187 | A1* | 9/2002 | Aoyama et al. ............... 370/342 |
| 2004/0214602 | A1* | 10/2004 | Aoyama ...................... 455/561 |
| 2006/0172739 | A1* | 8/2006 | Wigard et al. ................ 455/442 |
| 2007/0019535 | A1* | 1/2007 | Sambhwani et al. ......... 370/203 |
| 2007/0019651 | A1* | 1/2007 | Saito .......................... 370/395.4 |
| 2008/0273510 | A1* | 11/2008 | Mudulodu et al. ............ 370/339 |
| 2008/0310372 | A1* | 12/2008 | Li et al. ........................ 370/335 |
| 2009/0227260 | A1* | 9/2009 | Anreddy et al. .............. 455/450 |
| 2010/0029288 | A1* | 2/2010 | Wang et al. ................... 455/450 |
| 2010/0157861 | A1 | 6/2010 | Na et al. |

* cited by examiner

*Primary Examiner* — Sophia Vlahos
(74) *Attorney, Agent, or Firm* — Edell, Shapiro & Finnan, LLC

(57) ABSTRACT

Techniques are provided for receiving uplink transmissions at a plurality of antennas at a base station from a plurality of client stations. Uplink spatial transmissions are analyzed to produce a plurality of direction of arrival (DOA) components associated with the plurality of client stations. The DOA components associated with the plurality of client stations are compared with each other and two or more client stations are selected to participate in an uplink collaborative spatial multiplexing transmission session based on dissimilarities of their DOA components.

21 Claims, 6 Drawing Sheets

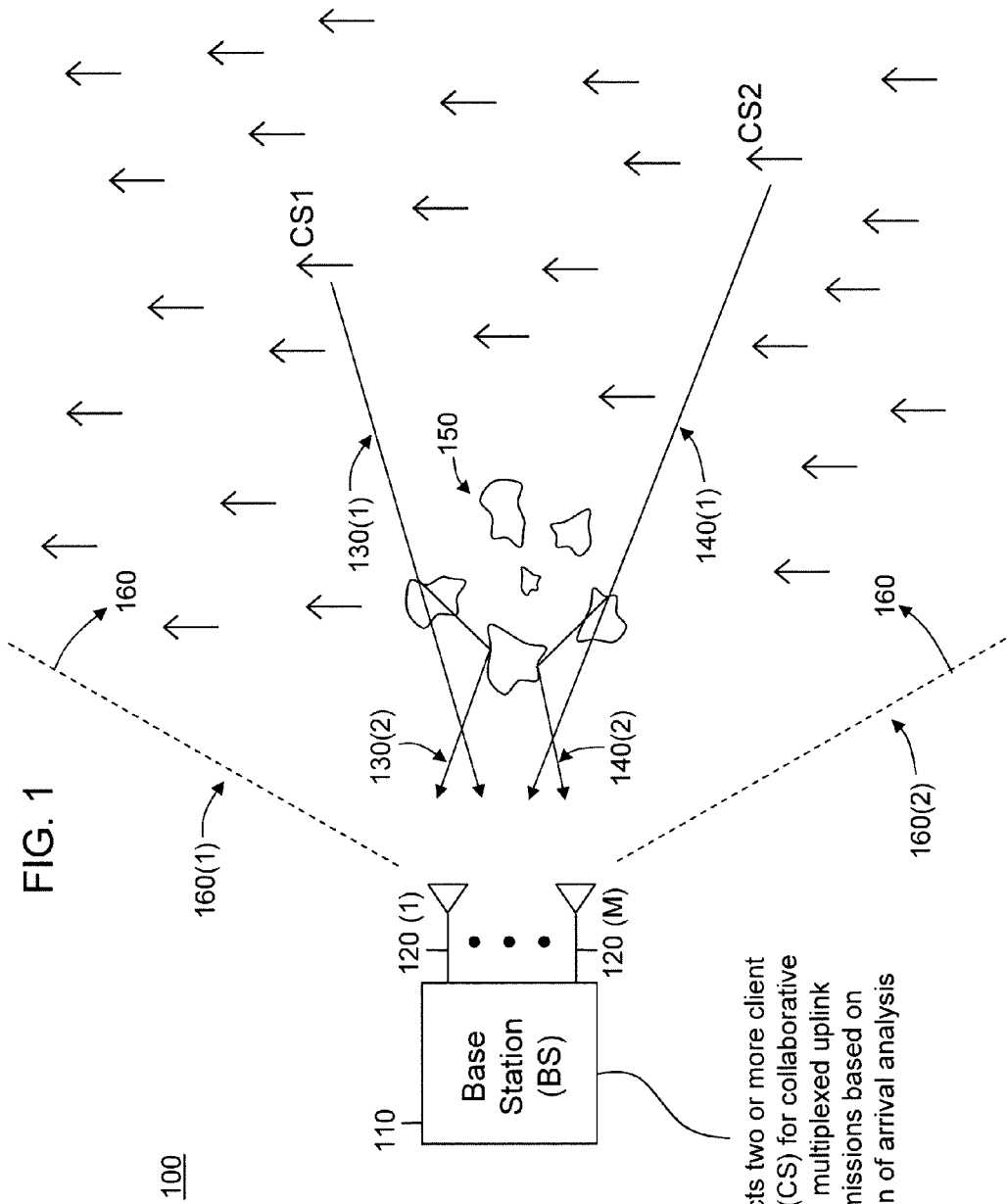

Set of dominant DOAs for CS1 from uplink transmissions from CS1

Set of dominant DOAs for CS2 from uplink transmissions from CS2

Collected set of dominant DOAs for CS1 & CS2 from uplink transmissions from CS1 & CS2 combined

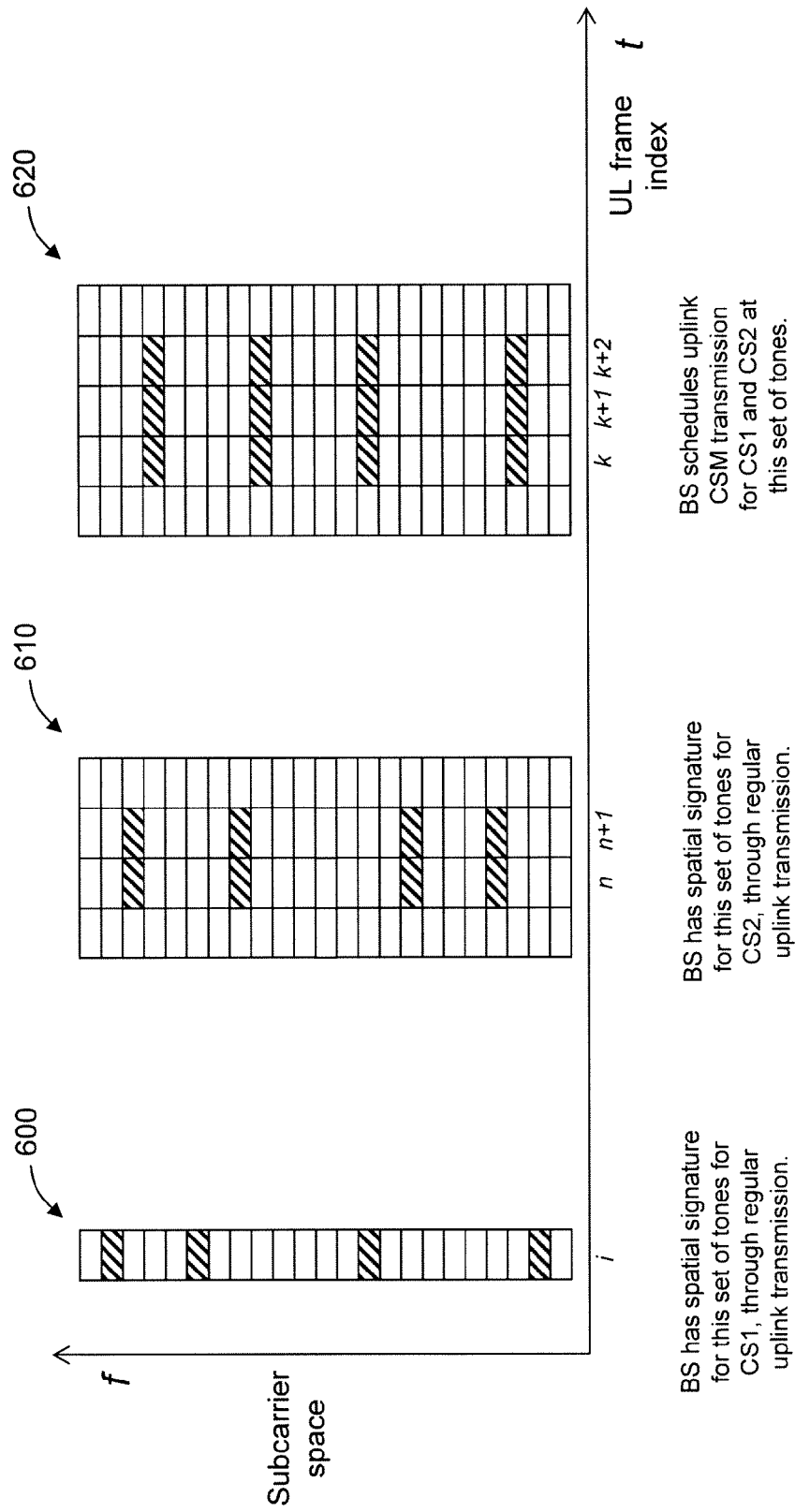

US 8,908,783 B2

SCHEDULING COLLABORATIVE UPLINK TRANSMISSIONS IN OFDMA SYSTEMS USING MULTIPATH DIRECTION OF ARRIVAL ANALYSIS

TECHNICAL FIELD

The present disclosure relates to wireless communication devices and systems and more particularly to collaborative spatial multiplexing in multiple-input multiple-output wireless communication systems.

BACKGROUND

Collaborative spatial multiplexing (CSM) is a mandatory feature in IEEE 802.16 (commercially known as WiMAX®) and the $3^{rd}$ Generation Partnership Project Long Term Evolution (LTE) based communications systems. CSM is a bandwidth-saving technique, where two or more client stations (CSs) transmit their uplink data simultaneously using the same bandwidth resource. There is an apparent collision of the traffic between individual CSs when transmitting simultaneously using the same bandwidth resource and this normally would cause interference. However, by using antenna arrays at a base station (BS), the interference can be removed by using multiple-input multiple-output (MIMO) detection techniques, as well as carefully selecting the CSs involved in CSM uplink transmissions.

The performance of CSM depends on the spatial-dissimilarity between the spatial signatures of the CSs involved in uplink CSM. The difficulty in CSM scheduling for orthogonal frequency division multiple access (OFDMA) based technologies, such as WiMAX and LTE, is that the BS has limited knowledge of the spatial signatures of the CSs across the uplink spectrum since the spatial signature is frequency dependent, and CSs will likely be transmitting on different sets of subcarriers. Thus, the BS may not have the spatial signature of all CSs involved in a potential uplink CSM session in the frequency subcarriers that the BS would like to schedule for an upcoming CSM session. Hence, the BS cannot determine the degree of spatial signature correlation for uplink transmissions from the CSs.

BRIEF DESCRIPTION OF THE DRAWINGS

FIG. 1 is a block diagram showing an example of a wireless communication system in which a first communication device (e.g., base station) receives multipath transmissions from two second devices (e.g., client stations).

FIG. 6 is a diagram illustrating an example in which a BS schedules and assigns subcarriers for a pair of CSs participating in an uplink CSM transmission session.

DESCRIPTION OF EXAMPLE EMBODIMENTS

Overview

Techniques are provided for receiving uplink transmissions at a plurality of antennas at a base station from a plurality of client stations or devices. Uplink spatial transmissions are analyzed to produce a plurality of DOA components associated with the plurality of client stations. The DOA components associated with the plurality of client stations are compared and two or more client stations are selected to participate in an uplink collaborative spatial multiplexing transmission session based on dissimilarities of their DOA components.

Example Embodiments

Referring first to FIG. 1, a wireless radio communication system 100 is shown. The system 100 comprises a first communication device, e.g., a base station (BS) 110, and a plurality of second communication devices, e.g., client stations (CSs), represented as vertical arrows. In this example, the CSs are in a 120 degree sector 160 with approximate sector boundaries at 160(1) and 160(2). Other sectoring arrangements are possible or the BS 110 may communicate in an omni-directional arrangement. For simplicity, only client stations CS1 and CS2 are labeled in FIG. 1. The BS 110 may connect to other wired data network facilities (not shown) and in that sense serves as a gateway or access point through which the CSs have access to those data network facilities.

The BS 110 comprises a plurality of antennas 120(1)-120(M) and the CSs may also comprise a plurality of antennas. The BS 110 may wirelessly communicate with individual ones of the CSs using a wideband wireless communication protocol in which the bandwidth is much larger than the coherent frequency bandwidth. Examples of such wireless communication protocols are WiMAX and LTE, as mentioned above.

CS1 and CS2 transmit uplink signals 130(1) and 140(1), respectively, to the BS 110. The uplink signals 130(1) and 140(1) comprise a plurality of subbands or subcarriers. Along the way the uplink signals 130(1) and 140(1) are reflected off various physical objects, e.g., buildings, terrain, and the like, depicted by scattering medium 150 to form reflected signals 130(2) and 140(2). The reflected signals 130(2) and 140(2) each represent a plurality of reflected signals that will arrive at the BS 110 at different angles (DOAs) and at slightly different times, i.e., signals 130(1) and 130(2) form a multipath signal from CS1, and signals 140(1) and 140(2) form a multipath signal from CS2. It is to be appreciated that in some uplink transmission environments direct or line of sight signals, e.g., signals 130(1) and 140(1) may not be available at BS 110 and all signals reaching the BS are scattered or reflected signals, e.g., signals 130(2) and 140(2). The BS 110 is configured to select two or more CSs, e.g., CS1 and CS2, for uplink CSM transmissions based on the dissimilarity of the DOAs of these multipath signals.

Figure 2A:
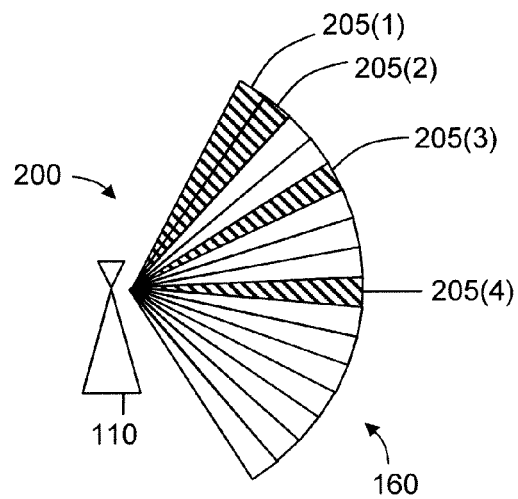
FIGS. 2A, 2B and 2C are diagrams illustrating dominant directions of arrival (DOAs) in a 120 degree sector for uplink transmissions received at a BS from two CSs.
Figure 2B:
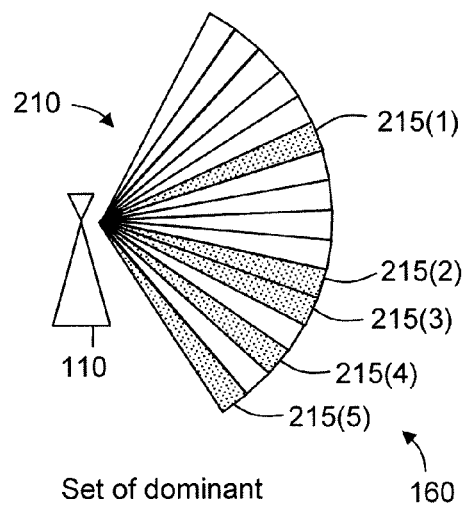
Figure 2C:
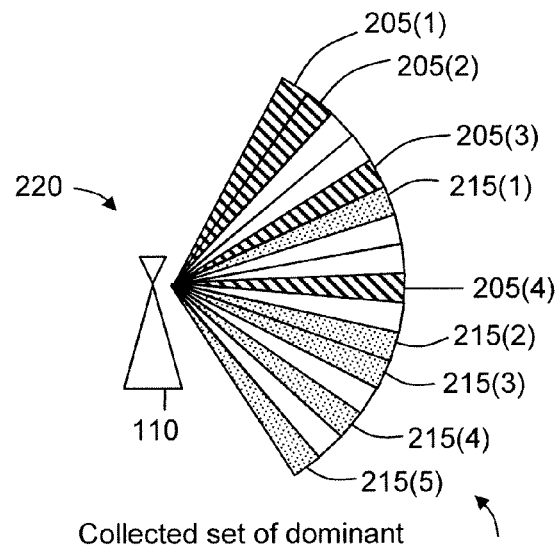

Turning to FIGS. 2A-2C, with continued reference to FIG. 1, a diagram is provided that illustrates dominant or strongest DOAs in the 120 degree sector 160 for uplink transmissions received at the BS 110 from CS1 and CS2. In this example, the 120 degree sector 160 has been divided into 16 sections or bins of approximately 7.5 degrees each. The selection of 16 sections is arbitrary and for illustration only. For example, the 120 degree sector 160 could be divided into 10 sections of approximately 12 degrees each or into 20 sections of approximately 6 degrees each. The actual number of sections will depend on the techniques used to spatially decompose the uplink signals and the computational resources of the BS 110.

In FIG. 2A at 200, the spatial signatures for the multipath uplink signals 130(1) and 130(2) have been analyzed, e.g., estimated and spatially decomposed, by the BS 110 into a plurality of DOA components. From the plurality of DOA components, the BS 110 selects a predetermined number or set of the dominant, or strongest, DOA components. Alternatively, the BS 110 may select all DOAs with a strength above a predetermined strength threshold. In this example, four dominant DOA components 205(1)-205(4) associated with CS1 are selected as shown by the sections with hatching.

In FIG. 2B, at 210, a set of five dominant DOA components 215(1)-215(5) associated with CS2 are selected as shown by the dotted sections. In FIG. 2C, at 220, the collected set of dominant DOA components associated with CS1 and CS2 is shown. In this example, none of the dominant DOA components associated with CS1 overlap the dominant DOA components associated with CS2 indicating that the spatial correlation between the uplink transmissions is CS1 and CS2 is relatively low. If a low spatial correlation exists, then CS1 and CS2 are good candidates for an uplink CSM transmission session.

Figure 3:
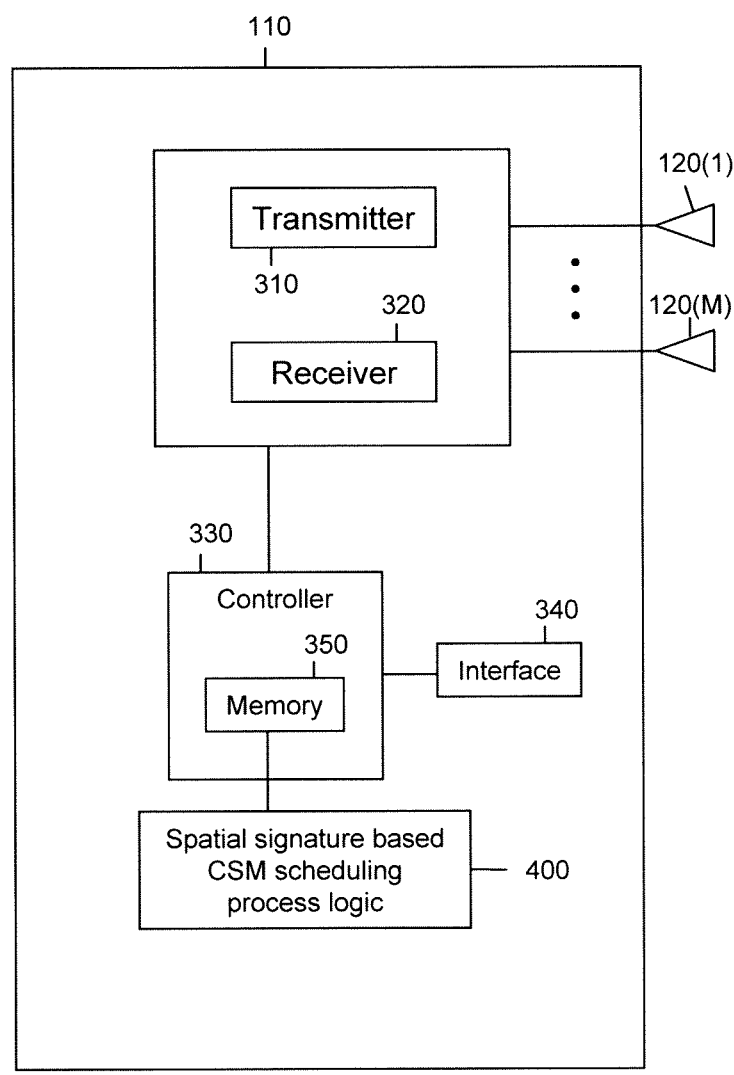
FIG. 3 is an example of a block diagram of a wireless communication device that is configured to schedule uplink CSM transmission sessions based on multipath DOA analysis.

Referring next to FIG. 3, an example of a block diagram is shown for a wireless communication device that may serve as a BS 110 and that is configured to execute spatial signature based CSM scheduling process logic 400. The process logic 400 will be described in conjunction with FIGS. 4 and 5. The BS 110 comprises a transmitter 310, a receiver 320, a controller 330, and an interface unit 340. The controller 330 supplies the data to the transmitter 310 to be transmitted and processes signals received by the receiver 320. In addition, the controller 330 performs other transmit and receive control functionality. Parts of the functions of the transmitter 310, receiver 320, and controller 330 may be implemented in a modem and other parts of the transmitter 310 and receiver 320 may be implemented in radio transmitter and radio transceiver circuits. It should be understood that there are analog-to-digital converters (ADCs) and digital-to-analog converters (DACs) in the various signal paths to convert between analog and digital signals. The interface unit 340 enables communication between the BS 110 and other network elements in the system 100, such as by way of a wired network.

The transmitter 310 may comprise individual transmitter circuits that supply respective upconverted signals to corresponding ones of a plurality of antennas (antennas 120(1)-120(M)) for transmission. The receiver 320 receives the signals detected by each of the antennas 120(1)-120(M) and supplies corresponding antenna-specific receive signals to controller 330. It is understood that the receiver 320 may comprise a plurality of receiver circuits, each for a corresponding one of a plurality of antennas. For simplicity, these individual receiver circuits and individual transmitter circuits are not shown.

The controller 330 is a data processing device, e.g., a microprocessor, microcontroller, systems on a chip (SOCs), or other fixed or programmable logic. The controller 330 has a memory 350 that may be any form of random access memory (RAM) or other data storage block that stores data used for the techniques described herein. The memory 350 may be separate or part of the controller 330. Instructions for performing the spatial signature based CSM scheduling process logic 400 may be stored in the memory 350 for execution by the controller 330. In general, the process 400 selects two or more CSs, e.g., CS1 and CS2, to participate in a CSM session based on uplink spatial signatures for CSs in the coverage area for BS 110, e.g., sector 160.

The functions of the controller 330 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 350 stores data used for the computations or functions described herein (and/or to store software or processor instructions that are executed to carry out the computations or functions described herein). Thus, the process 400 may be implemented with fixed logic or programmable logic (e.g., software/computer instructions executed by a processor or field programmable gate array (FPGA)), or the processor readable tangible medium may be encoded with instructions that, when executed by a processor, cause the processor to execute the process 400.

Figure 4:
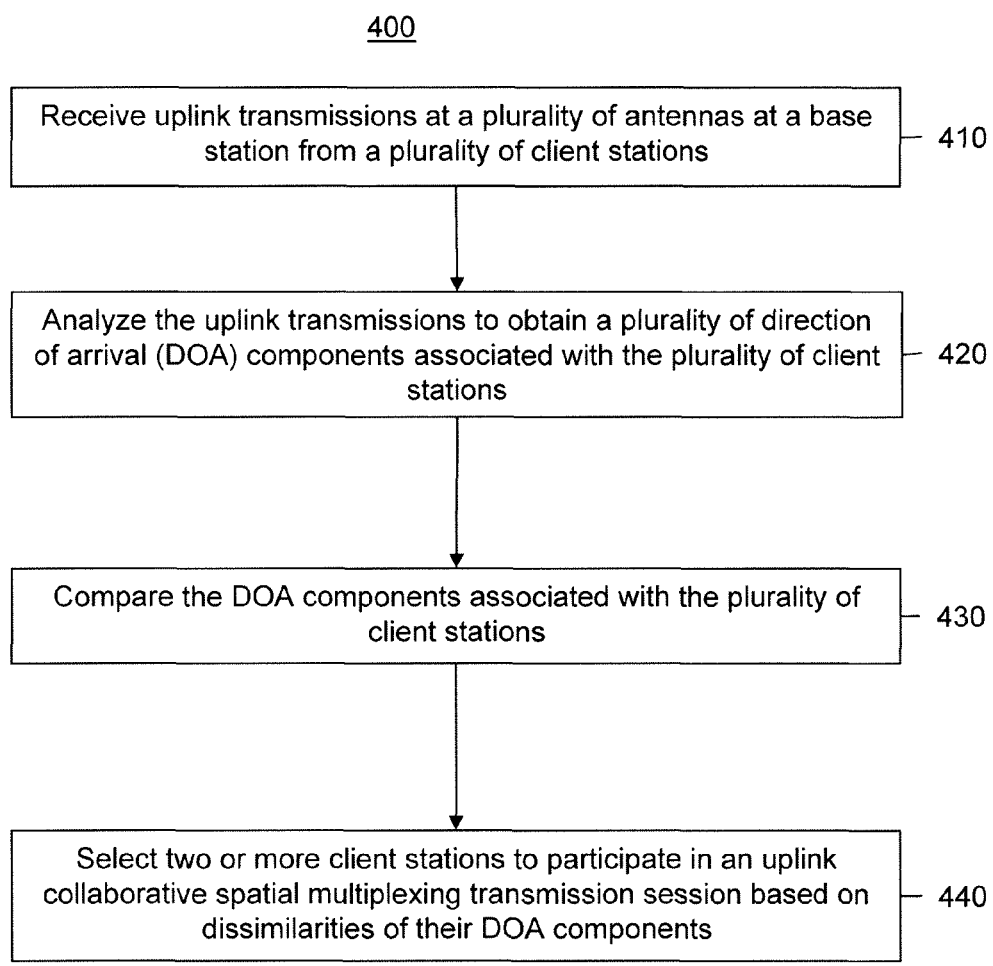
FIG. 4 is a flow chart generally depicting a process for selecting two or more CSs to participate in an uplink CSM transmission session.

Referring to FIG. 4, the spatial signature based CSM scheduling process logic 400 is now described. Reference is also made to FIG. 1 for purposes of this description. At 410, uplink transmissions are received at a plurality of antennas, e.g., antennas 120(1)-120(M), of a base station, e.g., BS 110, from a plurality of CSs, e.g., CS1 and CS2. These uplink transmissions from which the spatial signatures are determined are not sent during a CSM session, i.e., CS1 and CS2 have not been previously scheduled for an uplink CSM transmission session, although the uplink transmissions could be associated with a prior CSM session. At 420, the uplink transmissions are analyzed to produce or obtain a plurality of DOA components.

In one example, an uplink spatial signature is estimated for transmissions received from each of the plurality of client stations, e.g., estimating the spatial signature associated with CS1 using signals 130(1) and 130(2), and estimating the spatial signature associated with CS2 using signals 140(1) and 140(2). The BS 110 is configured to estimate the uplink spatial signature by generating a covariance matrix based on signals received at the plurality of antennas, and decompose the uplink spatial signature by computing a singular value decomposition of the covariance matrix (e.g., eigenvalue decomposition). Other singular value decomposition techniques may be used in addition to the eigenvalue decomposition technique. The uplink spatial signature is then spatially decomposed into a plurality of DOA components using a transform or computational method. In one example, a fast Fourier transform (FFT) is used. The DOA components are computed as:

$$[u]^H = FFT(y, L),$$

where u represents a decomposed spatial signature, y is the estimated received signal, and L is the transform size and represents a number of desired DOA components, e.g., the 16 sections described above in connection with FIGS. 2A, 2B and 2C.

At 430, the DOA components associated with the plurality of client stations are compared. The DOAs associated with various client stations are compared in order to find dissimilarities among their spatial signatures. When the spatial signatures of two CSs are similar, then interference between the two CSs will occur when they make simultaneous transmissions during a CSM session and the BS may not be able to distinguish or separate the two signals. Therefore, if any two CSs share common DOA components then the two CSs could be rejected, i.e., not selected, for participation in a CSM transmission session. At 440, two or more CSs are selected to participate in an uplink CSM transmission session based on dissimilarities of their DOA components. As uplink channel conditions change, the BS may periodically repeat the process 400.

Figure 5:
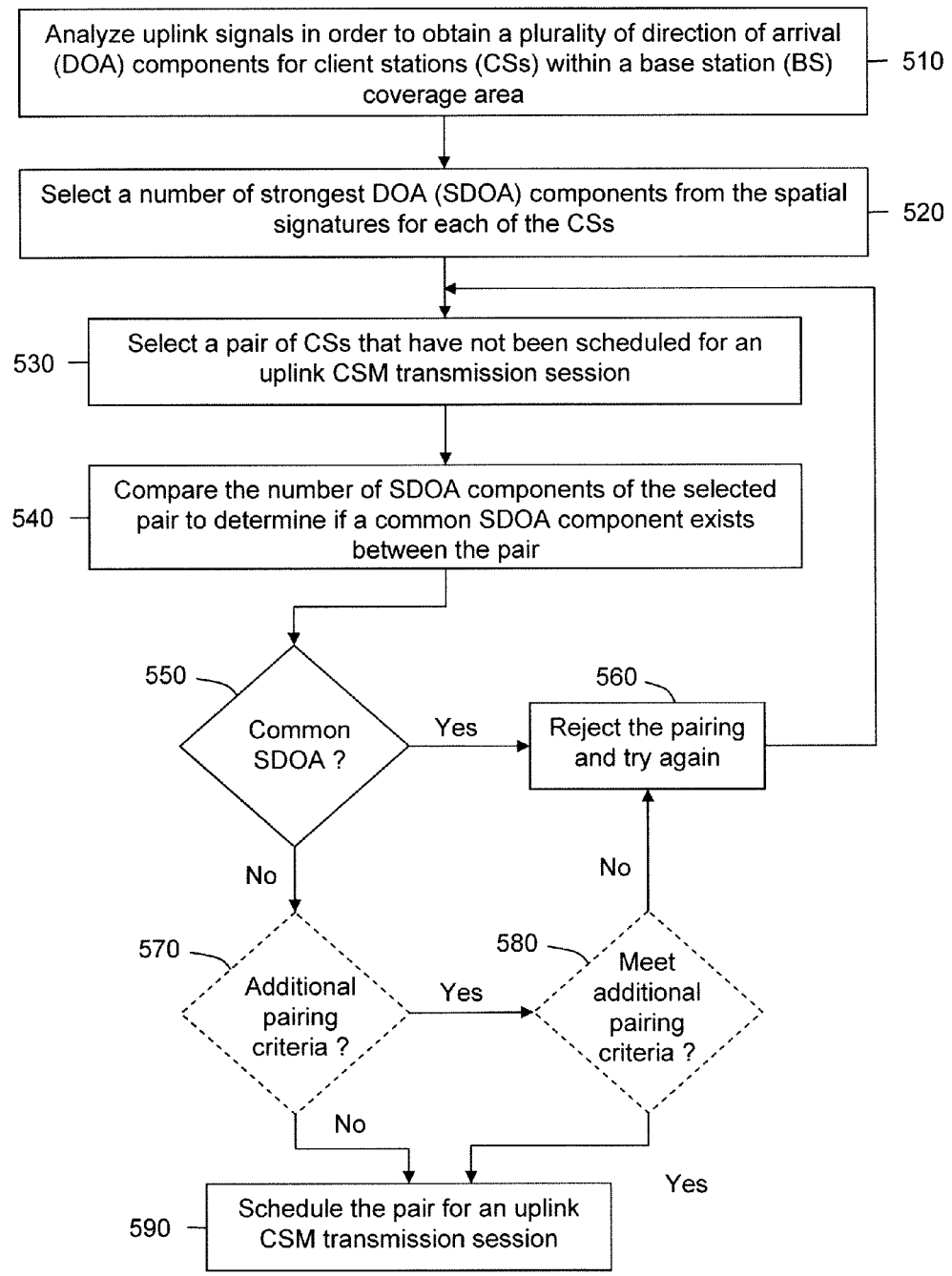
FIG. 5 is a flow chart depicting a specific example of a process for pairing CSs to participate in an uplink CSM transmission session.

Turning to FIG. 5, a specific example of how to implement the spatial signature based CSM scheduling process logic 400 is described. At 510, uplink signals are analyzed in order to obtain a plurality of DOA components for CSs within a BS coverage area. In one example, an uplink transmission is received with 12 uplink partially used sub-carrier (PUSC) tiles spread over a 5 MHz bandwidth assuming an ITU Ped-B fading channel model. The base station has eight antennas. The spatial signature over all tiles can be represented by a 12×8 (12 PUSC tiles×8 antennas) complex matrix. In one example, the first four columns of the complex matrix corresponding to antennas 1-4 can be represented as:

$$\begin{matrix}
-0.0344-0.1456i & -0.2428-0.0213i & -0.0861-0.2996i & -0.0454-0.4108i \\
0.0100-0.1545i & -0.0218-0.4168i & -0.2481-0.2432i & -0.2492+0.1445i \\
-0.2640-0.0586i & -0.2099-0.0908i & -0.1356-0.0408i & -0.2917+0.1180i \\
-0.1801-0.2016i & -0.3524+.0755i & -0.3262+0.2835i & 0.0263+0.0075 \\
-0.1478+0.0236i & -0.3910+0.1485i & -0.4336+0.0043i & 0.3367+0.1020i \\
-0.5061-0.1799i & -0.3323+0.1372i & 0.1059+0.0976i & 0.0380+0.0093i \\
-01993-0.1834i & -0.0830+0.0730i & -0.2565+0.2175i & 0.0278+0.0805i \\
-0.1362+0.0659i & 0.0176+0.0548i & -0.1582+0.0321i & -0.0411-0.0038i \\
-0.2820+0.0948i & 0.1487-0.0119i & 0.3657+0.0511i & -0.0980-0.0260i \\
-0.3424+0.1451i & 0.1913+0.0558i & 0.2893-0.0352i & -0.0400-0.1899i \\
0.0181-0.2268i & -0.1574+0.1194i & -0.1636+0.3077i & 0.4985+0.1701i \\
0.3330-0.0149i & -0.1433-0.1098i & -0.4391+0.0387i & -0.1065-0.1521i
\end{matrix}$$

The last four columns of the complex matrix corresponding to antennas 5-8 can be represented as:

$$\begin{matrix}
-0.1282+0.0108i & -0.0701+0.3707i & 0.3565+0.0350i & 0.6025-0.0000i \\
0.0113+0.1490i & 0.5853+0.0000i & 0.1998+0.1084i & -0.3429+0.2530i \\
-0.0620+0.0935i & 0.6548-0.0000i & 0.3118-0.2434i & -0.2441-0.3133i \\
0.3068-0.0353i & 0.5469-0.0000i & 0.1576-0.2444i & -0.0916-0.3493i \\
0.4228-0.1181i & -0.0686-0.0626i & 0.0446+0.0182i & 0.5359-0.0000i \\
-0.0691-0.0249i & 0.3080+0.0285i & 0.6769+0.0000i & 0.0113+0.0249i \\
0.6468+0.0000i & 0.3172-0.1778i & -0.4224-0.1502i & -0.0655+0.1955i \\
0.6631-0.0000i & 0.3495-0.2618i & -0.3829-0.3710i & -0.1770+0.0025i \\
0.1984+0.0150i & 0.6235-0.0000i & -0.0963+0.0453i & 0.5311-0.1448i \\
0.1511-0.0657i & 0.6341-0.0000i & 0.0846-0.0521i & -0.5084-0.0438i \\
0.6092+0.0000i & -0.0748-0.0918i & -0.2654-0.2216i & -0.0574+0.0488i \\
0.1395-0.0935i & -0.3086+0.0619i & -0.1619-0.0817i & 0.6836-0.0000i
\end{matrix}$$

Applying an FFT with a size of 16 (i.e., 16 DOA sections) to the above 12×8 complex matrix results in the following 16×12 (16 DOAs×12 PUSC tiles) real matrix:

$$\begin{matrix}
0.3362 & 0.0287 & 0.3446 & 0.2231 & 0.1029 & 0.0627 & 0.0043 & 0.2499 & 0.1087 & 0.2458 & 0.1769 & 0.1235 \\
2.4285 & 1.2849 & 1.1445 & 1.1406 & 1.4869 & 1.8989 & 0.1563 & 0.1683 & 0.4231 & 0.4558 & 0.2632 & 0.7602 \\
0.9972 & 1.5728 & 0.4394 & 0.5892 & 1.3390 & 1.4346 & 0.5509 & 0.3010 & 1.2816 & 1.4204 & 0.4370 & 1.1926 \\
0.0848 & 0.6388 & 0.0727 & 0.5278 & 0.4457 & 0.2057 & 0.5219 & 0.7662 & 0.5857 & 0.8091 & 0.3987 & 0.0019 \\
1.1070 & 1.6073 & 0.5957 & 0.7952 & 1.8966 & 1.5569 & 0.8291 & 0.7763 & 1.9635 & 1.5328 & 0.8780 & 2.3155
\end{matrix}$$

-continued

| | | | | | | | | | | | |
|---|---|---|---|---|---|---|---|---|---|---|---|
| 1.1325 | 1.0973 | 1.2417 | 0.5673 | 1.1842 | 0.5827 | 1.1465 | 0.7235 | 3.2859 | 1.9905 | 1.2145 | 2.9990 |
| 0.2270 | 0.2539 | 0.3435 | 0.0104 | 0.0636 | 0.1444 | 0.5945 | 0.4658 | 0.4941 | 0.0698 | 0.4618 | 0.7575 |
| 0.3092 | 0.0725 | 0.1056 | 0.1863 | 0.2856 | 0.1968 | 0.0001 | 0.0679 | 0.2263 | 0.4121 | 0.0020 | 0.6969 |
| 0.1328 | 0.0145 | 0.0048 | 0.0340 | 0.3454 | 0.1275 | 0.2657 | 0.0309 | 0.1531 | 0.0378 | 0.1501 | 0.0667 |
| 0.0950 | 0.2161 | 0.1016 | 0.0027 | 0.0013 | 0.5384 | 0.0409 | 0.0223 | 0.0237 | 0.3169 | 0.0129 | 0.8121 |
| 0.0945 | 0.2646 | 0.1143 | 0.2080 | 0.5469 | 0.0156 | 0.7315 | 0.3575 | 0.1104 | 0.0676 | 0.0272 | 0.0228 |
| 0.5063 | 0.3701 | 1.3574 | 0.8823 | 1.6037 | 1.9215 | 1.1539 | 1.8728 | 2.0969 | 2.6337 | 0.2295 | 2.2853 |
| 1.9715 | 2.4320 | 2.0574 | 0.0151 | 2.5627 | 2.3599 | 2.2720 | 2.6027 | 2.2633 | 3.1037 | 2.5293 | 2.1375 |
| 2.2700 | 3.4442 | 3.0888 | 2.7175 | 1.1621 | 0.0457 | 4.6668 | 3.1077 | 0.3172 | 0.1034 | 5.0179 | 0.0231 |
| 3.1338 | 1.8262 | 4.1004 | 6.1250 | 1.1430 | 2.2983 | 2.7521 | 3.2160 | 1.6254 | 1.5220 | 3.3398 | 1.3839 |
| 1.1738 | 0.8761 | 0.8877 | 1.9756 | 1.8302 | 2.6103 | 0.3136 | 1.2712 | 1.0412 | 1.2785 | 0.8614 | 0.4213 |

To obtain the strength of the DOAs, a sum of the elements of the real matrix across the tiles (rows) is computed with the following results:

| | | | | | | | |
|---|---|---|---|---|---|---|---|
| 2.0073 | 11.6113 | 11.5556 | 5.0591 | 15.8539 | 17.1657 | 3.8863 | 2.5614 |
| 1.3633 | 2.1839 | 2.5608 | 16.9134 | 26.3070 | 25.9643 | 32.4658 | 14.5409 |

In the first row are the DOA-sums across rows 1-8 and in the second row are the DOA-sums across rows 9-16. At 520, a number of strongest DOA (SDOA) are selected from the spatial signatures for each of the CSs in the coverage area. The number of selected SDOA components could be a predetermined number or the number could be based on a threshold DOA strength. For example, if a threshold minimum DOA strength of 15.0 is set, then rows 5, 6, 12, 13, 14, and 15 may be selected as a number of DOA components that may be used for comparison, i.e., for row 5, 15.8539>15.0 and so on. In this case the rows would correspond to sections 5, 6, 12, 13, 14, and 15 in a 120 degree sector, e.g., the 16 sections of sector 160 described in connection with FIGS. 2A, 2B and 2C.

The above example is one way of performing DOA analysis. Many other methods now known or hereinafter developed may be used, such as, e.g., Multiple Signal Classification (MUSIC), Estimation of Signal Parameters via Rotational Invariance Techniques (ESPRIT), and Minimum Variance Distortionless Response (MVDR), also known as Capon, to name a few.

At 530, a pair of CSs are selected that have not been scheduled for a CSM transmission session. At 540, the number of SDOAs of the selected pair are compared to determine if a common SDOA component exists between the pair. At 550, if a common SDOA exists, then at 560, the pairing is rejected and the process returns to 530 in order to select another potential pair of CSs for CSM. If a common SDOA does not exist between the pair, then the pair may be scheduled for an uplink CSM transmission session.

In another example, a pair of CSs may already be scheduled for, and already participating in, an uplink CSM transmission session. If the CSs are mobile devices then the CSs may, over the course of time, move toward each other and the spatial signatures of the pair of CSs may become correlated. When this happens, i.e., the spatial signatures have sufficiently changed, the uplink CSM transmission session will have to be terminated. Thus, the BS periodically evaluates, or repeats the spatial signature based CSM scheduling process logic 400, for all CSs in the coverage area for pairing, re-pairing, and termination with respect to CSM sessions, i.e., the BS periodically repeats receiving, analyzing, and comparing in order to determine if the uplink spatial signatures for each of the plurality of client stations has sufficiently changed prior to performing the selecting function of 440.

At 570, optional additional pairing criteria may be implemented, where the optional nature of this function is indicated by the dashed lines. Additional paring criteria may include neighboring DOA components, i.e., in addition to common DOA components neighboring DOA components may be used to reject, or not select, a pairing of CSs. Two DOA components may be defined as "neighboring" if their directions/angles are within a predetermined threshold interval. Thus, any combination of DOAs, SDOAs, DOA strength thresholds, and/or angle thresholds may be used to determine when two or more CSs may be selected to participate in an uplink CSM transmission session. If the additional paring criteria are not met, then at 580, the pairing is rejected, i.e., the pair is not selected for CSM, and the process returns to 530 in order to select another potential pair of CSs for CSM. Otherwise, the process continues to 590, and the pair is scheduled for an uplink CSM transmission session.

Referring now to FIG. 6, with addition reference to FIG. 1, a diagram illustrating how BS 110 might schedule and assign subcarriers for a pair of CSs participating an uplink CSM transmission session. In FIG. 6 the vertical axis represents the subcarrier space or tones with increasing frequency index f towards the top of the diagram. The horizontal axis represents the uplink frame index with time t increasing towards the right of the diagram as shown. At 600, frame index i, the BS 110 has a frequency dependent spatial signature for tones for CS1 as indicated by hatching. CS1 may transmit on other tones (not shown) for which the BS 110 does not have an associated spatial signature, i.e., the BS 110 only has a spatial signature for CS1 in a subset of the available bandwidth.

At 610, frame indices n and n+1, the BS 110 has a frequency dependent spatial signature for tones for CS2 as indicated by hatching. The set of tones for which BS 110 has spatial signatures for CS1 and CS2 are at different frequencies, therefore the spatial signatures for CS1 and CS2 cannot be directly compared. However, the BS 110 can perform spatial decomposition, e.g., according to the spatial signature based CSM scheduling process logic 400 described herein, in order to remove frequency dependencies contained within the spatial signatures. When it is determined that the spatial signatures of CS1 and CS2 are dissimilar enough for CSM, then at 620 the BS 110 schedules CS1 and CS2 for an uplink CSM transmission session for frames k through k+2 at the tones shown. The BS 110 schedules the CSM session by sending the appropriate command or control information to the selected CSs for participation in the CSM session, i.e., according to the rules of the particular wireless communication standard in use.

Techniques are described herein for receiving uplink transmissions at a plurality of antennas at a base station from a plurality of client stations. Uplink spatial transmissions are analyzed to produce a plurality of DOA components associated with the plurality of client stations. The DOA components associated with the plurality of client stations are compared and two or more client stations are selected to participate in an uplink collaborative spatial multiplexing transmission session based on dissimilarities of their DOA components.

Although the subject matter illustrated and described herein as embodied in one or more specific examples, it is nevertheless not intended to be limited to the details shown and described herein, since various modifications and structural changes may be made without departing from the scope and range of equivalents of the claims.

What is claimed is:

1. A method comprising:
   at a base station, receiving uplink transmissions at a plurality of antennas from a plurality of client stations;
   analyzing the uplink transmissions to obtain a plurality of direction of arrival (DOA) components for each of the plurality of client stations;
   determining a plurality of strongest DOA components for each of the plurality of client stations, wherein the plurality of strongest DOA components are a subset of the DOA components, wherein each of the strongest DOA components are associated with one of a plurality of segments, and wherein each segment is a degree range corresponding to DOA; and
   selecting two or more client stations from the plurality of client stations to participate in an uplink collaborative spatial multiplexing transmission session, wherein the two or more client stations collaborate in an uplink session to send uplink transmissions on substantially the same frequency channel at substantially the same time, even though the uplink transmissions substantially interfere, wherein the selecting is based on dissimilarities of the plurality of strongest DOA components of the two or more client stations.

2. The method of claim 1, further comprising:
   comparing, with one another, DOA components selected from the plurality of strongest DOA components that are stronger than a predetermined strength threshold.

3. The method of claim 2, further comprising determining if a common strongest DOA component exists among the plurality of strongest DOA components, wherein selecting comprises not selecting the two or more client stations of the plurality of client stations that have strongest DOA components in common.

4. The method of claim 2, further comprising determining whether a strongest DOA component for one client station of the plurality of client stations is within a predetermined interval of a strongest DOA of another client station of the plurality of client stations, wherein selecting comprises not selecting the two or more client stations of the plurality of client stations that have strongest DOA components within the predetermined interval.

5. The method of claim 1, further comprising periodically repeating the receiving, the analyzing, and the determining in order to determine if uplink spatial signatures for each of the plurality of client stations has sufficiently changed prior to selecting.

6. The method of claim 1, further comprising:
   receiving subsequent uplink transmissions from the two or more client stations participating in the uplink session;
   determining subsequent segment associations of strongest DOA components of the subsequent uplink transmissions; and
   in response to determining that the subsequent segment associations substantially overlap, terminating the uplink session.

7. A method comprising:
   at a base station, receiving uplink transmissions at a plurality of antennas from a plurality of client stations;
   analyzing the uplink transmissions to obtain a plurality of direction of arrival (DOA) components for each of the plurality of client stations;
   comparing the plurality of DOA components with each other, wherein each of the DOA components are associated with one of a plurality of segments, and wherein each segment is a degree range corresponding to DOA; and
   selecting two or more client stations from the plurality of client stations to participate in an uplink collaborative spatial multiplexing transmission session, wherein the two or more client stations collaborate in an uplink session to send uplink transmissions on substantially the same frequency channel at substantially the same time, even though the uplink transmissions substantially interfere, wherein the selecting is based on dissimilarities of the compared plurality of DOA components of the two or more client stations, wherein selecting comprises selecting two or more client stations of the plurality of client stations that have not been previously scheduled for an uplink collaborative spatial multiplexing transmission session.

8. An apparatus comprising:
   a plurality of antennas;
   a receiver that is configured to process uplink transmissions received at the plurality of antennas from a plurality client stations;
   a controller coupled to the receiver, wherein the controller:
      analyzes the uplink transmissions to obtain a plurality of direction of arrival (DOA) components for each of the plurality of client stations;
      determines a plurality of strongest DOA components for each of the plurality of client stations, wherein the plurality of strongest DOA components are a subset of the DOA components;
      determines segments associations by associating each of the strongest DOA components with one of a plurality of segments, wherein each segment is a degree range corresponding to DOA; and
      selects two or more client stations from the plurality of client stations to participate in an uplink collaborative spatial multiplexing transmission session, wherein the two or more client stations collaborate in an uplink session to send uplink transmissions on substantially the same frequency channel at substantially the same time, even though the uplink transmissions substantially interfere, wherein the selecting is based on dissimilarities of the plurality of strongest DOA components of the two or more client stations.

9. The apparatus of claim 8, wherein the controller compares, with one another, DOA components selected from the plurality of strongest DOA components that are stronger than a predetermined strength threshold.

10. The apparatus of claim 9, wherein the controller determines if a common strongest DOA component exists among the plurality of strongest DOA components, and does not select the two or more client stations of the plurality of client stations that have strongest DOA components in common.

11. The apparatus of claim 9, wherein the controller determines whether a strongest DOA component for one client station of the plurality of client stations is within a predetermined interval of a strongest DOA of another client station of the plurality of client stations, does not select the two or more client stations of the plurality of client stations that have strongest DOA components within the predetermined interval.

12. The apparatus of claim 8, wherein the controller periodically analyzes, determines, and selects based on the uplink transmissions received at the plurality of antennas from the plurality client stations.

13. The apparatus of claim 8, wherein controller:
receives subsequent uplink transmissions from the two or more client stations participating in the uplink session;
determines subsequent segment associations of strongest DOA components of the subsequent uplink transmissions; and
in response to determining that the subsequent segment associations substantially overlap, terminates the uplink session.

14. An apparatus comprising:
a plurality of antennas;
a receiver that is configured to process uplink transmissions received at the plurality of antennas from a plurality client stations;
a controller coupled to the receiver, wherein the controller:
analyzes the uplink transmissions to obtain a plurality of direction of arrival (DOA) components for each of the plurality of client stations;
compares the DOA components with each other;
determines segments associations by associating each of the DOA components with one of a plurality of segments, wherein each segment is a degree range corresponding to DOA; and
selects two or more client stations from the plurality of client stations to participate in an uplink collaborative spatial multiplexing transmission session, wherein the two or more client stations collaborate in an uplink session to send uplink transmissions on substantially the same frequency channel at substantially the same time, even though the uplink transmissions substantially interfere, wherein the selecting is based on dissimilarities of the plurality of strongest DOA components of the two or more client stations, by selecting two or more client stations of the plurality of client stations that have not been previously scheduled for an uplink collaborative spatial multiplexing transmission session.

15. A non-transitory processor readable tangible medium encoded with instructions that, when executed by a processor, cause the processor to:

receive uplink transmissions at a plurality of antennas from a plurality of client stations;
analyze the uplink transmissions to obtain a plurality of direction of arrival (DOA) components for each of the plurality of client stations;
determine a plurality of strongest DOA components for each of the plurality of client stations, wherein the plurality of strongest DOA components are a subset of the DOA components;
determine segment associations by associating each of the strongest DOA components with one of a plurality of segments, wherein each segment is a degree range corresponding to DOA; and
select two or more client stations from the plurality of client stations to participate in an uplink collaborative spatial multiplexing transmission session, wherein the two or more client stations collaborate in an uplink session to send uplink transmissions on substantially the same frequency channel at substantially the same time, even though the uplink transmissions substantially interfere, wherein the selecting is based on dissimilarities of the plurality of strongest DOA components of the two or more client stations.

16. The non-transitory processor readable tangible medium of claim 15, further comprising instructions that, when executed by the processor, cause the processor to compare, with one another, DOA components selected from the plurality of strongest DOA components that are stronger than a predetermined strength threshold.

17. The non-transitory processor readable tangible medium of claim 16, further encoded with instructions that, when executed by a processor, cause the processor to determine if a common strongest DOA component exists among the number of strongest DOA components, wherein the instructions that cause the processor to select comprise instructions that, when executed by the processor, cause the processor to not select the two or more client stations of the plurality of client stations that have strongest DOA components in common.

18. The non-transitory processor readable tangible medium of claim 16, further encoded with instructions that, when executed by a processor, cause the processor to determine whether a strongest DOA component for one client station of the plurality of client stations is within a predetermined interval of a strongest DOA of another client station of the plurality of client stations, wherein the instructions that cause the processor to select comprise instructions that, when executed by the processor, cause the processor to not select the two or more client stations of the plurality of client stations that have strongest DOA components within the predetermined interval.

19. The non-transitory processor readable tangible medium of claim 15, wherein the instructions that cause the processor to select comprise instructions that, when executed by the processor, cause the processor to select two or more client stations of the plurality of client stations that have not been previously scheduled for an uplink collaborative spatial multiplexing transmission session.

20. The non-transitory processor readable tangible medium of claim 15, further encoded with instructions that, when executed by a processor, cause the processor to periodically perform the receive, the analyze, the determine, and the select operations based on the uplink transmissions received at the plurality of antennas from the plurality client stations.

21. The non-transitory processor readable tangible medium of claim 15, wherein instructions executed by the processor cause the processor to:

receive subsequent uplink transmissions from the two or more client stations participating in the uplink session;

determine subsequent segment associations of strongest DOA components of the subsequent uplink transmissions; and in response to determining that the subsequent segment associations substantially overlap, terminate the uplink session.

\* \* \* \* \*